(12) United States Patent
Cohn

(10) Patent No.: US 9,055,758 B2
(45) Date of Patent: Jun. 16, 2015

(54) CHEMICAL AND PRESERVATIVE FREE PEELED POTATOES

(71) Applicant: Smart Spuds Inc., Bradford (CA)

(72) Inventor: Larry Cohn, Bradford (CA)

(73) Assignee: Smart Spuds Inc., Bradford (CA)

( * ) Notice: Subject to any disclaimer, the term of this patent is extended or adjusted under 35 U.S.C. 154(b) by 0 days.

(21) Appl. No.: 13/777,146

(22) Filed: Feb. 26, 2013

(65) Prior Publication Data

US 2014/0242233 A1    Aug. 28, 2014

(51) Int. Cl.
| | |
|---|---|
| *A23L 1/216* | (2006.01) |
| *B65B 1/26* | (2006.01) |
| *B65B 25/04* | (2006.01) |
| *A23L 1/212* | (2006.01) |
| *A23B 7/00* | (2006.01) |
| *A23N 12/02* | (2006.01) |
| *A23N 7/02* | (2006.01) |
| *B65B 55/00* | (2006.01) |

(52) U.S. Cl.
CPC ............... *A23L 1/2163* (2013.01); *B65B 55/00* (2013.01); *B65B 1/26* (2013.01); *B65B 25/041* (2013.01); *A23L 1/2123* (2013.01); *A23B 7/00* (2013.01); *A23N 12/023* (2013.01); *A23N 7/02* (2013.01)

(58) Field of Classification Search
CPC ............ A23B 7/00; A23N 7/02–7/026; A23N 12/023; A23L 1/0011; A23L 1/2123; A23L 1/2163; A23L 3/36; A47J 17/14–17/20; B65B 55/00; B65B 1/26; B65B 25/04–25/041; B65B 31/00

USPC .......... 426/392, 637, 410–415, 418–419, 518, 426/524, 506
See application file for complete search history.

(56) References Cited

U.S. PATENT DOCUMENTS

| | | | | |
|---|---|---|---|---|
| 1,996,453 | A | * | 4/1935 | Brock ........................... 426/119 |
| 2,006,146 | A | | 6/1935 | Miller |
| 2,187,382 | A | * | 1/1940 | Libbey ..................... 229/120.32 |
| 2,241,436 | A | | 5/1941 | Williams |
| 2,472,460 | A | * | 6/1949 | Banks ............................. 99/630 |
| 2,477,006 | A | * | 7/1949 | Pierson ........................... 99/624 |
| 2,506,793 | A | | 5/1950 | Kalmar et al. |
| 2,597,065 | A | | 5/1952 | Chase |
| RE23,890 | E | * | 11/1954 | Chase ........................... 426/431 |
| 3,016,303 | A | * | 1/1962 | Cooley .......................... 426/464 |
| 3,158,187 | A | * | 11/1964 | Smith et al. ..................... 99/626 |

(Continued)

FOREIGN PATENT DOCUMENTS

| | | |
|---|---|---|
| CA | 2807681 A1 | 8/2014 |
| CN | 101647489 A | 2/2010 |

(Continued)

OTHER PUBLICATIONS

"Glenroy, Inc.: Flexible Packaging Terms & Materials", Mar. 22, 2010, accessible at http://web.archive.org/web/20100322193905/http://www.glenroy.com/tools/flexible-packaging.*

(Continued)

*Primary Examiner* — Drew Becker
(74) *Attorney, Agent, or Firm* — Bereskin & Parr LLP/S.E.N.C.R.L., s.r.l.

(57) ABSTRACT

Various embodiments are described herein of a method and apparatus that can be used to extend the shelf-life of potatoes without adding preservatives or chemicals.

10 Claims, 3 Drawing Sheets

(56) References Cited

U.S. PATENT DOCUMENTS

| | | | |
|---|---|---|---|
| 3,602,280 A * | 8/1971 | Hill et al. | 99/484 |
| 3,745,914 A * | 7/1973 | Wallace | 99/630 |
| 3,773,527 A * | 11/1973 | Ruggerone | 426/637 |
| RE29,137 E * | 2/1977 | Mohwinkel | 426/412 |
| 4,097,612 A | 6/1978 | Powrie et al. | |
| 4,450,760 A * | 5/1984 | Wilson | 99/536 |
| 4,505,937 A * | 3/1985 | Demeulemeester et al. | 426/8 |
| 4,832,963 A * | 5/1989 | Demeulemeester et al. | 426/8 |
| 4,957,761 A * | 9/1990 | Hale | 426/410 |
| 5,204,133 A * | 4/1993 | Hibbs et al. | 426/393 |
| 5,245,919 A * | 9/1993 | Neidigh | 99/623 |
| 5,447,734 A * | 9/1995 | Street | 426/268 |
| 5,750,165 A * | 5/1998 | Erway | 426/49 |
| 5,945,146 A * | 8/1999 | Twinam | 426/324 |
| 2005/0147721 A1 | 7/2005 | Melendez Juarez et al. | |
| 2005/0204937 A1 * | 9/2005 | Baird | 99/623 |

FOREIGN PATENT DOCUMENTS

| | | |
|---|---|---|
| CN | 101990932 A | 3/2011 |
| CN | 102187894 A | 9/2011 |
| CN | 102652557 A | 9/2012 |
| CN | 102669251 A | 9/2012 |
| CN | 102187984 B | 1/2013 |
| EP | 0811323 A1 | 10/1997 |
| EP | 1683424 B1 | 7/2006 |
| KR | 0185001 B1 | 3/1999 |
| KR | 1020010025786 A | 4/2001 |
| KR | 100314492 B1 | 11/2001 |
| WO | WO9302572 A1 | 2/1993 |
| WO | 2014131103 A1 | 9/2014 |

OTHER PUBLICATIONS

"NewsChannel5 viewer puts freshvac containers, Vacu-Seal system and Keepeez lids to the test", Dec. 23, 2011.*

Pringle, R., Bishop, C., & Clayton, R. (2009). Potatoes postharvest [electronic resource] / by Robert Pringle, Chris Bishop, and Rob Clayton. Cambridge, MA : CABI, 2009. pp. 218-232.*

Talburt, W. F. & Smith, O. (1967). Potato Processing. Westport, CT: The AVI Publishing Company, 1967. pp. 182-185.*

CN101990932A—EnglishTranslation—npl.

CN102187894A—EnglishTranslation—npl.

CN102652557A—EnglishTranslation—npl.

CN102669251A—EnglishTranslation—npl.

KR0185001B1—EnglishTranslation—npl.

KR100314492B1—EnglishTranslation—npl.

KR1020010025786A—EnglishTranslation—npl.

Document relating to International Application No. PCT/CA2014/000132, dated May 22, 2014 (International Search Report and Written Opinion).

Beltran et al. "Effect of different sanitizers on microbial and sensory quality of fresh-cut potato strips stored under modified atmosphere or vacuum packaging", Postharvest biology and Technology, vol. 37, p. 37-46, 2005.

Barbosa-Canovas et al. Chapter 5 "Handling and Preservation of Fruits and Vegetables by Combined Methods for Rural Areas", Technical Manual, FAO Agricultural Services Bulletin 149, Food and Agriculture Organization of the United Nations, Rome, ISBN 92-5-104861-4, 2003.

Barth et al. "Fresh-cut Vegetables", The Commercial Storage of Fruits, Vegetables, and Florist and Nursery Stocks, USDA, ARS, Agriculture Handbook No. 66, Dr. Ken Gross, available online at http://www.ba.ars.usda.gov/hb66/ in Nov. 2002, revised Apr. 2004 Under "Commodity Summaries (cont.)/Fresh-cut produce/Fresh-cut Vegetables", Potato (sticks, diced, sliced, peeled) section.

Garcia et al., Chapter 9, "Preservative Treatments for Fresh-Cut Fruits and Vegetables", Fresh-Cut Fruits and Vegetables: Science, Technology, and Market, CRC Press, Olusola Lamikanra, pp. 267-303, Feb. 14, 2002, Whole document, in particular "Reducing Temperature" section at p. 287.

* cited by examiner

| SAMPLE | CODE | TEST | RESULTS | UNITS |
|---|---|---|---|---|
| Day 2 2013-Jan-08 (Tue) | 1001 | ACC | 29,000 | CFU/g |
| Peeled Potatoes – Lot code: 001 | 1003 | Staph. aureus | <10 | CFU/g |
| Storage Temp: 4 | 1039 | Cl. perfringens | <10 | CFU/g |
| | 1040 | Bacillus cereus | <10 | CFU/g |
| | 2144 | Coliform/E. coli | | |
| | | Coliform | 360 | CFU/g |
| | | E. coli | <10 | CFU/g |
| | 2314 | Salmonella | not detected | /25g |
| Day 5 2013-Jan-11 (Fri) | 1001 | ACC | 43,000 | CFU/g |
| Peeled Potatoes – Lot code: 001 | 2144 | Coliform/E. coli | | |
| Storage Temp: 4 | | Coliform | 1,000 | CFU/g |
| | | E. coli | <10 | CFU/g |
| Day 7 2013-Jan-13 (Sun) | 1001 | ACC | 120,000 | CFU/g |
| Peeled Potatoes – Lot code: 001 | 1003 | Staph. aureus | <10 | CFU/g |
| Storage Temp: 4 | 1039 | Cl. perfringens | <10 | CFU/g |
| | 1040 | Bacillus cereus | <10 | CFU/g |
| | 2144 | Coliform/E. coli | | |
| | | Coliform | 410 | CFU/g |
| | | E. coli | <10 | CFU/g |
| | 2314 | Salmonella | not detected | /25g |

REFERENCES

| | | |
|---|---|---|
| 1001 | Aerobic Colony Count | HPB Method MFHPB-18 (October 2001) |
| 1003 | Staph. aureus | HPB Method MFHPB-21 (September 2005). |
| 1039 | Clostridium perfringens | HPB Method MFHPB-23 (November 2001). |
| 1040 | Bacillus cereus | HPB Method MFLP-42 (April 2003). |
| 2144 | Coliform/E. coli 3M Petrifilm | HPB Method MFHPB-34 (February 2001). |
| 2314 | Salmonella Vidas /25g | HPB Method, MFHPB-24 (November 2001 |

FIG. 3

CHEMICAL AND PRESERVATIVE FREE PEELED POTATOES

FIELD

The various embodiments described herein generally relate to a method and a processing line for producing chemical and preservative free peeled potatoes.

BACKGROUND

Currently, peeled potatoes are dipped in a sodium metabisulphite treatment mix at less than 10 ppm to achieve the required 7 day shelf life. However, this is counterproductive to patients in healthcare and long-term care facilities with heart disease and diabetes since sodium metabisulphite only contributes to longer recovery time, longer hospital stays and faster returns for treatment. This adds to healthcare costs which are already too high.

SUMMARY OF VARIOUS EMBODIMENTS

In a broad aspect, at least one embodiment described herein provides a method for peeling, cutting and packaging potatoes, wherein the method comprises maintaining the potatoes in a temperature range that is just above freezing; peeling the potatoes; inspecting the peeled potatoes; and vacuum-packing the inspected potatoes into bags that have a high oxygen barrier, wherein the packaging is performed before the potatoes start to discolor.

In at least one embodiment, the temperature range is from about 1 to 10 degrees Celsius.

In at least one embodiment, the temperature range is from about 1 to 3 degrees Celsius.

In at least one embodiment, the bags comprise nylon bags having a thickness of at least 2 mm.

In at least one embodiment, the bags have an oxygen transfer rate that is less than about 5 cc/100 inches$^2$/24 hours at 72 degrees Fahrenheit at 0% RH.

In at least one embodiment, the vacuum-packing is done using about 10 to 0.5 millibar of suction pressure.

In at least one embodiment, the potatoes are packed in a flat pack to minimize formation of air pockets.

In at least one embodiment, the method further comprises spraying the potatoes with a cold mist having a temperature in the temperature range during and after peeling until the potatoes are packed.

In at least one embodiment, the method further comprises piling packages of potatoes in a given box with a cardboard layer between each row in the given box in order to distribute weight of the packages evenly.

In at least one embodiment, the method further comprises cutting the inspected potatoes before vacuum packing, the cutting being done according to an end user requirement.

In at least one embodiment, prior to processing the potatoes are kept in a first cooler at a temperature range of about 1 to 3 degrees Celsius, and after packaging the packaged potatoes are kept in a second cooler at about 1 degree Celsius.

In another broad aspect, at least one embodiment described herein provides a processing line for peeling, cutting and packaging potatoes wherein the processing line comprises a pre-processing stage configured to peel the potatoes; an inspection station coupled to the pre-processing stage and configured to inspect and potentially trim the peeled potatoes; a packaging stage coupled to the inspection station and configured to vacuum-pack the inspected potatoes using bags that have a high oxygen barrier before the potatoes start to discolor, wherein the potatoes are maintained in a temperature range just above freezing during the packaging process.

In at least one embodiment, the processing line comprises refrigeration equipment to maintain the potatoes in the temperature range.

In at least one embodiment, the packaging stage comprises a bagging and vacuum sealing station configured to pack the potatoes in a flat pack to minimize formation of air pockets and the vacuum-packing uses about 10 to 0.5 millibar of suction pressure.

In at least one embodiment, the processing line comprises spray equipment to spray the potatoes with a cold mist having a temperature in the temperature range during and after peeling until the potatoes are packed.

In at least one embodiment, the packaging stage comprises a boxing station that is configured to pile packages of potatoes in boxes with a cardboard layer between each row in order to distribute weight of the packages evenly in a given box.

In at least one embodiment, the processing line comprises at least one further processor configured to cut the inspected potatoes before vacuum packing, the cutting being done according to an end user requirement.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which:

FIG. 3 shows an analytical report of the bacterial content of a sample on several days after packaging using the embodiments described herein.

DETAILED DESCRIPTION OF THE EMBODIMENTS

Figure 1:
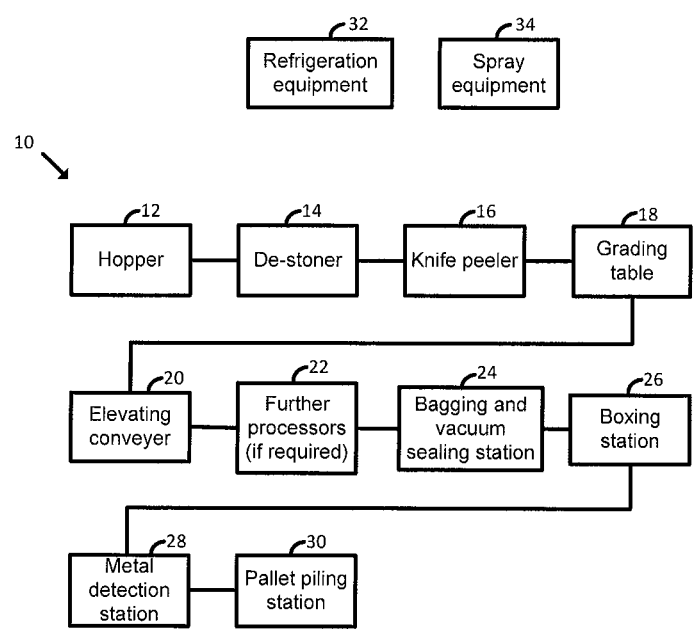
FIG. 1 shows a block diagram of an example embodiment of a processing line that can be used to produce chemical and preservative free peeled potatoes.

Various apparatuses or methods will be described below to provide an example of an embodiment of the claimed invention. No embodiment described below limits any claimed invention and any claimed invention may cover methods or systems that differ from those described below. The claimed inventions are not limited to systems or methods having all of the features of any one system or process described below or to features common to multiple or all of the systems or methods described below. It is possible that an apparatus or method described below is not an embodiment of any claimed invention. Any invention disclosed in a system or method described below that is not claimed in this document may be the subject matter of another protective instrument, for example, a continuing patent application, and the applicants, inventors or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical or processing connotation as used herein to indicate that two elements or devices can be directly connected to one another or connected to one another through one or more intermediate elements or devices via a mechanical coupling such as joining two elements together using conveyors between the two elements so that an exit aperture of one element is physically aligned with the input aperture of another element so that potatoes flow through the various stages seamlessly or using conveyors between the two elements.

It should be noted that terms of degree such as "substantially", "about" and "approximately" as used herein mean a reasonable amount of deviation of the modified term such that the end result is not significantly changed. These terms of degree should be construed as including a slight deviation of the modified term if this deviation would not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about". The term "about" means a slight acceptable deviation of the number to which reference is being made.

Furthermore, in the following passages, different aspects of the embodiments are defined in more detail. Each aspect so defined may be combined with any other aspect or aspects unless clearly indicated to the contrary. In particular, any feature indicated as being preferred or advantageous may be combined with at least one other feature or features indicated as being preferred or advantageous.

Described herein are various example embodiments of a processing line and method that can be used for a potato peeling, cutting, and packaging system that does not use any chemicals or preservatives (e.g. sodium metabisulphites) but can produce packaged potatoes with an extended shelf life of up to approximately 7 days, which is similar to conventional packaged potatoes that use chemicals or preservatives. In alternative embodiments, the potatoes can be processed by also using a cutting machine that can provide a desired cutting action such as, but not limited to, dicing, slicing, parisienne cuts and the like, for example.

Referring now to FIG. 1, shown therein is a block diagram of an example embodiment of a system or a processing line 10 that can be used to produce chemical and preservative-free peeled potatoes. The processing line 10 comprises a hopper 12, a de-stoner 14, a knife peeler 16, a grading table 18, an elevating conveyer 20, further processing machines 22 (if required), a bagging and vacuum sealing station 24, a boxing station 26, a metal detection station 28 and a pallet piling station 30. The processing line 10 also includes refrigeration equipment 32 and spraying equipment 34, which are distributed along various stages of the processing line 10 where required. It should be noted that some of these elements may be optional for certain purposes or applications, as will now be described.

The refrigeration equipment 32 is used to cool potatoes (that have already been washed and graded) down to the required operating temperature range, which is generally in the range of about 1 to 10 degrees Celsius and in some embodiments is preferably in the range of about 1 to 3 degrees Celsius. The refrigeration equipment 32 maintains the potatoes in the required operating temperature range while they are processed by the processing line 10. The refrigeration equipment may include a first cooler for the raw product (prior to processing) at the required operating temperature range, such as 1 to 3 degrees Celsius, and a second cooler for the packaged product that is kept at a smaller, cooler portion of the required operating temperature range such as approximately 1 degree Celsius, for example.

The processing plant which houses the processing line 10 may be kept at a slightly higher temperature such as approximately 10 degrees Celsius, although in some cases the processing plant can have a temperature in the range of about 1 to 20 degrees Celsius. When the potatoes that have been cooled down to the required operating temperature range of about 1 to 3 degrees Celsius, for example, are first taken out of the first cooler, they will retain the coolness for a short while in order to be processed. The refrigeration equipment 32 may not be needed in environments or at times of the year which naturally provide the required operating temperature conditions for the processing line 10. However, in order to provide packaged cut potatoes that have an optimal shelf-life, the raw product may be refrigerated all the time before processing.

The hopper 12 and the de-stoner 14 can be considered to be a pre-processing stage of the processing line 10. Potatoes that have been washed and graded are introduced into the processing line 10 via the hopper 12 and then move to the de-stoner 14 which removes any stones and excess dirt. The hopper 12 and the de-stoner 14 may be 2 separate machines, as is known by those skilled in the art. Depending on the particular machine that is used, the potatoes may be elevated upwards through the de-stoner 14 into the peeling machine 16.

The potatoes are then provided to the peeling machine 16, which can be an abrasive and a knife combo peeler (mostly knife) or just a knife peeler, for example, which peels the potatoes. As the potatoes are being peeled and thereafter, they are subjected to a cold mist that is provided by the spraying equipment 34. The cold mist is used to keep the potatoes from experiencing discoloration. The cold mist may be in a required operating temperature range of about 1 to 3 degrees Celsius; however, the cold mist can also be at slightly different temperatures that are above freezing. The cold mist typically comprises water that does not have any preservatives and is continually tested for bacteria and contaminates. The cold mist can be provided by several spray nozzles for each of the various stages of the processing line 10 that require the cold mist. Each of these stages may have four or more sprayers, for example.

The peeled potatoes are then sent to the grading table 18 so that the peeled potatoes can be inspected and trimmed as needed in order to meet the particular packaging requirements for the potatoes (which depends on their end use). At this stage, the cold mist is still being sprayed on the potatoes as they are inspected and possibly trimmed.

After the grading table 18, the potatoes are moved up an elevating conveyer 20 to the next station in the processing line 10. In other embodiments, the conveyer may be horizontal or downward sloping depending on the relative positions of the grading table 18 and the further processors 22 or the bagging and vacuum sealing station 24. During this stage, the cold mist is still being sprayed on the potatoes.

After the potatoes are moved on the conveyer 20, there may be additional processing machines 22 depending on the particular requirements for the processed potatoes. For example there may be a cutting machine that can slice, dice or perform a parisienne cut, and the like. It should be noted that this stage is optional as it depends on the end user requirements for the packaged potatoes. If this stage is included, then the potatoes are sprayed with the cold mist during this stage.

However, another possibility is to have a processing line that includes the additional processing machines 22 but also has a by-pass conveyer (not shown) which is coupled between the elevating conveyor and a packaging stage. In cases where the potatoes are not to be further cut, the potatoes are sent along the by-pass conveyer to the packaging stage.

The potatoes are packaged in the packaging stage, which in this example embodiment comprises the bagging and vacuum sealing station 24 and the boxing station 26. While the potatoes are being transported to the packaging stage and waiting to be packaged, the potatoes are sprayed with the cold mist.

At the bagging station 24, the potatoes are put into bags that have a low Oxygen Transfer Rate (OTR). An example of a packaging bag is a bag with a thickness of at least approximately 2 mm and a low OTR of less than about 5 cc/100 inches$^2$/24 hours at 72 degrees Fahrenheit at 0% Relative Humidity (RH) in a flat pack. However, it was noted that improved preservation resulted from using a bag having a thickness of about 3 mm and an OTR of about 3.5 cc/100 inches$^2$/24 hours at 72 degrees Fahrenheit at 0% Relative Humidity (RH) in a flat pack. The size of the bag varies depending on the packaging requirements. An example size for the bag can be 12×22 inches and the bag may be made of nylon. In other embodiments, the bag can be made of flexible film material such as poly-vinyl, combinations of several materials or an other suitable material that provides the OTR requirements noted herein and helps to maintain the freshness of the potatoes. For example, the bag can be made from a combination of about 0.75 mil nylon, adhesive, and about 2.95 mil polyethelene.

After the bag is filled, it is then vacuum-packed (i.e. vacuum sealed). An appropriate amount of suction is used that corresponds to the size of the bag so as to avoid sucking moisture out of the potatoes or leaving too much oxygen in the bag. For example, a Turbo Vac SB 820 (208 volt, 3 phase) vacuum-packing machine can be set to a setting of 35, which corresponds to about 1 millibar of suction pressure, to vacuum pack the potatoes into a 4 to 6 pound flat pack for a 12×22 inch sized bag. In other embodiments, the vacuum-packing machine can be operated at a setting in the range of about 20 to 45, which corresponds to about 10 to 0.5 millibar of pressure. The potatoes are packed into a flat pack to minimize the number of air pockets in any given bag, which also helps to preserve the potatoes.

After a bag is filled and vacuum-packed, the bags are heat-sealed. For example, the filled bags can be heat-sealed for about 2.3 seconds at regular heat or strength (for a 12×22 inch, 3 mm bag that has a high oxygen barrier). In alternative embodiments, the filled bags can be heat-sealed for about 1.5 to 3.25 seconds at regular heat or strength.

At the boxing station 26, the bags of potatoes are then placed in boxes such that they are lying flat with a cardboard layer between each row of bags in order to distribute weight evenly along any given row. This is done to protect the potatoes in the bags. The size and weight of the bags that are used determines the number of layers and the size of the required box.

The boxed potatoes are then moved to a post processing stage which comprises a metal detection station 28 and a pallet piling station 30 in this example embodiment. At the metal detection stage 28, the boxes of packaged potatoes are inspected for quality control and food safety purposes to make sure that they do not contain any metal objects. Various types of machines can be used for metal detection including x-ray machines. After the metal detection station 28, the boxes of bagged potatoes that pass inspection are moved to the pallet piling station 30 where the boxes are piled on pallets.

At the end of the packaging process, once the pallets have been removed from the processing line 10, the pallets are then placed in the second cooler or a refrigerated environment that is maintained just above freezing, for example at about 1 degree Celsius or so, until the pallets are shipped.

The processing line 10 is generally operated at speeds such that it takes about 2 to 4 minutes from when the peeling is completed to when the potatoes are packed and sealed. The speed is chosen such that the potatoes do not start to discolor before they are packaged properly.

In some embodiments, the potatoes can be submerged in cold water to avoid discoloration prior to packaging.

In alternative embodiments, there can be processing lines which do not spray cold mists at various stages of the peeling and packaging process. For example, the cold mist is not needed if the potatoes are moved through the processing line fast enough so that they do not discolor. The speed of moving the potatoes along the processing line depends on the time of year, variety or type of potato and the specific gravity (moisture content) of the potato. It may be possible at most times of the year, to avoid using the spray mist when the potatoes are processed in about 2 to 4 minutes, but the use of the spray mist extends the time to that the potatoes can be processed and packaged before discoloring.

Figure 2:
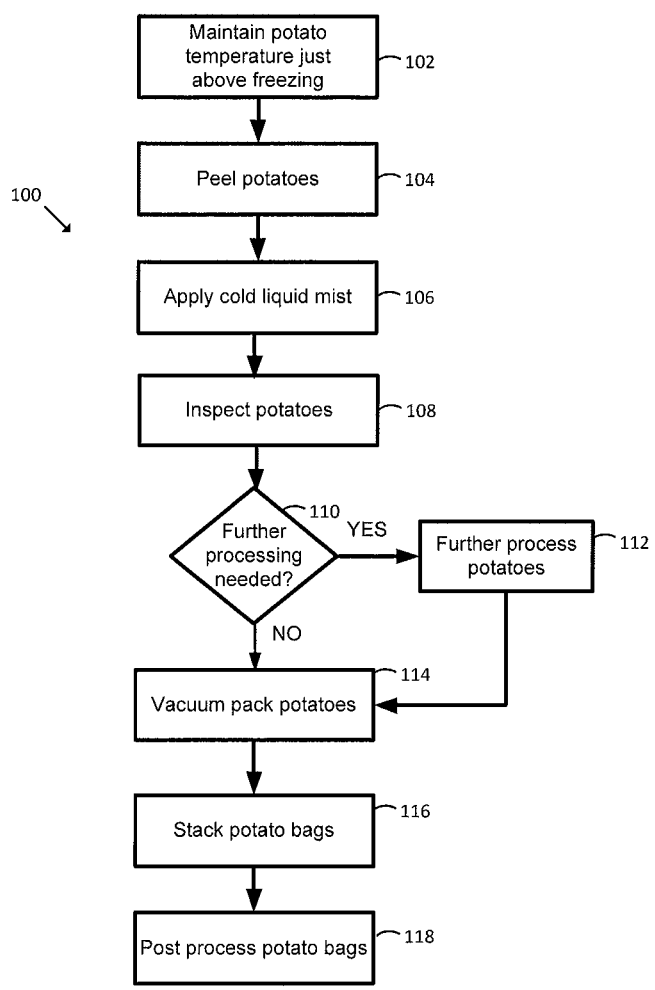
FIG. 2 shows a flowchart of an example embodiment of a packaging method that can be used to produce chemical and preservative free peeled potatoes.

FIG. 2 is a flowchart of an example embodiment of a packaging method 100 that can be used to produce chemical and preservative free peeled potatoes. At 102, the potatoes are maintained at just above freezing, in the range of about 1 to 10 degrees and more preferably in the range of 1 to 3 degrees Celsius. At 104, the potatoes peeled. At 106, a cold mist is applied to the potatoes until they are packaged to maintain the potatoes in the desired operating temperature range and to prevent discoloration. At 108, the potatoes are inspected, and possibly trimmed, to ensure that they meet the packaging requirements. At 110 it is determined if further processing, such as further cutting, of the potatoes is required. If this determination is false, the potatoes are sent to a packaging stage for packaging at 114. If the determination at 110 is true, then the potatoes are further processed at 112 and then packaged at 114. At 114, the potatoes are vacuum-packed as described previously using a bag made of a suitable material with a certain thickness to achieve a low OTR of about 3.5 cc/100 inches$^2$/24 hours at 72 degrees Fahrenheit at 0% RH in a flat pack. At 116, for mass production, the vacuum-packed potato backs are flat-stacked in boxes to minimize any air pockets within the bags. At 118, the boxed potato hags are post-processed for duality control and food safety and then piled into pallets for shipping to a desired destination. Prior to and during shipping, the pallets are maintained at a temperature range that is preferably about 1 degree Celsius although the temperature range may also be about 1 to 10 degrees Celcius. In some cases, the packaged product may be more preferably at a temperature of about 1 degree Celsius during shipping. However, in reality, most trucks combine the packaged potatoes with other products that are maintained at 6 degrees Celsius. Therefore, for a portion of time in transit, the packaged potatoes may sometimes be kept at about 6 degrees Celsius.

Referring now to FIG. 3, shown therein is an analytical report of the bacterial content of a sample measured on several days after packaging using the embodiments described herein. The results show that the level of the measured bacteria are below safe limits even at 7 days after packaging without the use of preservative or chemicals.

To also help minimize the bacteria and other contaminants in the packaged potatoes, the processing plant can be maintained such that it achieves the best and highest level of food safety SQF 2000, LEVEL 2 and also has HACCP (Hazard Analysis of Critical Control Points) and uses GMP (Good Manufacturing Practices).

The various embodiments of the potato peeling, cutting and packaging system and method described herein have a number of advantages over conventional techniques. Firstly, no sodium is used with the various systems and methods taught herein and yet the packaged potatoes can have a similar shelf-life as those that are produced using chemicals or preservatives. Accordingly, the potatoes that are packaged with the various systems and methods described herein are a healthier product for human consumption, which is very important for people that are suffering with heart disease and diabetes. Furthermore, these packaged potatoes may possibly lead to longer life expectancies, shorter hospital stays (which will lower healthcare costs) as well as longer periods of time before a person has to return to a hospital for treatment (which should also lower healthcare costs).

The potatoes that are prepared and packaged using the various systems and methods described herein can be used in many different settings such as hospitals, long-term care facilities, nursing homes, other healthcare facilities, upscale restaurants, food cafeterias, schools, universities, colleges, day care centers and the like.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without generally departing from the embodiments described herein.

The invention claimed is:

1. A method for peeling and packaging potatoes using a processing line, wherein the method comprises:
    maintaining the potatoes in a temperature range that is from about 1 to 10 degrees Celsius;
    peeling the potatoes;
    inspecting the peeled potatoes;
    vacuum-packing the inspected potatoes into bags that have an oxygen barrier; and
    spraying the potatoes with a mist having a temperature in the temperature range during and after peeling until the potatoes are vacuum-packed, wherein the vacuum-packing is performed before the potatoes start to discolor, the peeling and vacuum-packing are done without using chemicals or preservatives, and the potatoes are maintained in the temperature range while the potatoes are processed by the processing line.

2. The method of claim 1, wherein the temperature range is from about 1 to 3 degrees Celsius.

3. The method of claim 1, wherein the bags comprise nylon bags having a thickness of at least 2 mm.

4. The method of claim 3, wherein the bags have an oxygen transfer rate that is less than about 5 cc/100 inches$^2$/24 hours at 72 degrees Fahrenheit at 0% RH.

5. The method of claim 1, wherein the vacuum-packing is done using about 10 to 0.5 millibar of suction pressure.

6. The method of claim 1, wherein the potatoes are packed flat to minimize formation of air pockets.

7. The method of claim 1, wherein the method further comprises piling packages of potatoes in a given box with a cardboard layer between each row in the given box in order to distribute weight of the packages evenly.

8. The method of claim 1, wherein the method further comprises cutting the inspected potatoes before vacuum packing, the cutting being done by slicing, dicing or performing a parisienne cut on the potatoes.

9. The method of claim 1, wherein prior to the peeling and packaging of the potatoes, the potatoes are kept in a first cooler at a temperature range of about 1 to 3 degrees Celsius, and after packaging the packaged potatoes are kept in a second cooler at about 1 degree Celsius.

10. A method for peeling and packaging potatoes using a processing line before the potatoes start to discolor without using chemicals or preservatives, wherein the method comprises:
    maintaining the potatoes in a temperature range that is from about 1 to 10 degrees Celsius;
    peeling the potatoes;
    inspecting the peeled potatoes;
    vacuum-packing the inspected potatoes flat to minimize formation of air pockets; and
    spraying the potatoes with a mist having a temperature in the temperature range during and after peeling until the potatoes are vacuum-packed, wherein the potatoes are maintained in the temperature range while the potatoes are processed by the processing line.

* * * * *